ively, the amount of the enzyme should be from 0.1 to 100 units per gram protein.

United States Patent [19]
Chiba et al.

[11] 4,232,044
[45] Nov. 4, 1980

[54] ENZYMATIC IMPROVEMENT OF PROTEIN FLAVOR

[75] Inventors: Hideo Chiba, Uji; Ryuzo Sasaki, Kyoto; Masaaki Yoshikawa, Joyo; Naofumi Takahashi, Kyoto; Etsuro Sugimoto, Nagoya; Hirotoshi Samejima, Machida, all of Japan

[73] Assignee: Kyowa Hakko Kogyo Co., Ltd., Tokyo, Japan

[21] Appl. No.: 935,095

[22] Filed: Aug. 21, 1978

[30] Foreign Application Priority Data

Aug. 19, 1977 [JP] Japan .................................. 52-99142
Aug. 19, 1977 [JP] Japan .................................. 52-99143

[51] Int. Cl.³ ............................ A23L 1/20; A23J 3/00
[52] U.S. Cl. ................................... 426/44; 426/46; 426/52; 426/56; 426/59; 435/272
[58] Field of Search ...................... 426/44, 46, 52, 53, 426/56, 59, 60, 62; 195/4, 5; 435/272

[56] References Cited

U.S. PATENT DOCUMENTS

| | | | |
|---|---|---|---|
| 3,048,492 | 8/1962 | Barton | 426/46 |
| 3,364,034 | 1/1968 | Hoersch et al. | 426/44 X |

FOREIGN PATENT DOCUMENTS 51-48453 4/1976 Japan .......................................... 195/4

OTHER PUBLICATIONS

Eriksson, *J. Agr. Food Chem.*, 23(2), (1975), 126–128.
Altschul, *New Protein Foods*, vol. 1A, (1974), Academic Press, New York, 444–445.
Smith et al., *Soybeans: Chemistry and Technology*, vol. 1, The AVI Publishing Co., Inc., Westport, Conn., 1972, 340–344.

*Primary Examiner*—Esther M. Kepplinger
*Attorney, Agent, or Firm*—Fitzpatrick, Cella, Harper & Scinto

[57] ABSTRACT

Food protein flavor is improved by enzymatic conversion of the aldehydes and alcohols in such protein.

8 Claims, No Drawings

ENZYMATIC IMPROVEMENT OF PROTEIN FLAVOR

BACKGROUND OF THE INVENTION

Although effective utilization of food resources, particularly protein, is in demand in view of the increasing population, the currently available protein is not always effectively utilized owing to disagreeable flavor. For example, it is well known that limited utilization of soybean protein preparations as a food ingredient is due to objectionable green bean flavor which is mainly brought about by aldehydes such as n-hexanal, propanal, 2,4-decadienal and the like. Since these aldehydes have very low threshold values, the presence of even a very small amount thereof can be perceived. Hence complete removal of the flavor components or complete conversion to compounds having much greater threshold values is necessary. These aldehydes, however, are present not only in free form but also in bound form in which the aldehydes interact so strongly with the soybean protein that no satisfactory method for complete removal thereof has heretofore been found.

As one of the known conversion methods, Japanese Patent Publication No. 9210/70 discloses a process for removing beany flavor from soybean milk by adding conidiospores of Aspergillus oryzae. In this method, n-hexanal in the soybean milk appears to be converted to n-hexanol which has a larger threshold value than n-hexanal. It has also been suggested, J. Agr. Food Chem. 23, 126(1975), that one can considerably reduce objectionable flavor of aldehydes through conversion of the aldehydes to alcohols by adding alcohol dehydrogenase and NADH. Although the threshold values of alcohols so produced are greater than the aldehydes, the alcohols nevertheless give off objectionable flavor under certain conditions. Moreover, in such process it is not certain that the aldehydes bound to proteins have been completely converted to the corresponding alcohols since the protein preparations containing such bound aldehydes regain objectionable flavor gradually during storage. It seems that such liberation is one of the causes for reversion flavor.

SUMMARY OF THE INVENTION

In accordance with the present invention, aldehydes and alcohols in a protein system containing aldehydes and/or alcohols are enzymatically converted to the corresponding acids which can be readily removed from a system containing protein. The enzymatic conversion of the invention is accomplished by utilizing aldehyde dehydrogenase, aldehyde oxidase and alcohol dehydrogenase. Aldehyde dehydrogenases and aldehyde oxidases used in this invention can irreversibly oxidize free aldehydes in the presence of a hydrogen acceptor or electron acceptor respectively as well as those aldehydes bound to protein. When there are alcohols as well as aldehydes, one can completely convert these flavor components into the acids by utilizing cooperative actions of aldehyde dehydrogenase and alcohol dehydrogenase in the presence of NAD+ (NAD is an abbreviation for nicotinamide adenine dinucleotide). Alcohol dehydrogenase catalyzes the reversible conversion between alcohol and aldehyde, while aldehyde dehydrogenase catalyzes irreversible conversion of aldehyde into the acid. The same principle applies when using aldehyde oxidase. The overall reaction results in the complete conversion of aldehydes and alcohols into the acids. Substrate specificities, in general, of the enzymes are rather broad.

A particular advantage of this invention is that it offers procedures by which objectionable flavor due to aldehydes and alcohols can be removed without any change in the functional properties of food proteins prepared from various sources.

Illustrative of the present invention, the interactions of aldehyde and the corresponding alcohol and acid with soybean protein were tested by using gel exclusion chromatography.

In this test, 30 ml of 20 mM phosphate buffer solution (pH 7.5) was added to 3 g of defatted soybean flour. The mixture was stirred at room temperature for one hour, and centrifuged at $12,000 \times g$ for 10 minutes. To 15 ml of the resulting supernatant (soybean extract) was added 21 mg of n-hexanal, n-hexanol or n-caproic acid. The solutions were stirred at room temperature for about 3 hours, and then 1 ml of each solution was passed through Sephadex G-50 column ($1 \times 38$ cm). Elution was carried out with 20 mM phosphate buffer solution (pH 7.5) at a flow rate of 0.5 ml/min., and the eluate was taken in 2.0 ml fractions. In each fraction n-hexanal was determined using aldehyde dehydrogenase, and n-hexanol, using alcohol dehydrogenase. The enzyme reactions were carried out in a phosphate buffer solution (pH 9.3) at 25° C. and amounts of n-hexanal and n-hexanol were determined by measuring the increase in absorption at 340 nm. In each fraction n-caproic acid was quantitatively determined by gas chromatography [Model Shimazu 6AMPFT made by Shimazu Seisakusho, Ltd. A glass column (3 mm $\times$ 2 m) containing a mixture of Thermon 1000 (5%), orthophosphoric acid (0.5%) and a carrier]. The protein content of each fraction was determined by the method of Lowry et al. Protein was eluted in fractions 5–10, which were found to have no green bean flavor (smell of n-hexanal). However, fractions 15–20 which must contain low-molecular weight substances were found to have a strong green bean flavor. Although no beany flavor due to n-hexanal was perceivable in the protein fractions, quantitative determination of aldehydes in each of the fractions using aldehyde dehydrogenase revealed that not only low-molecular weight fractions (fractions 15–20) but also protein fractions (fractions 5–10) contained almost equal amounts of aldehydes. The total amount of aldehyde in these fractions corresponded approximately to the amount found in the sample before gel chromatography. No perceivable green bean flavor in protein fractions would be due to interaction of n-hexanal with soybean protein. Quantitative detection of the aldehyde in protein fractions indicates that aldehyde dehydrogenase used here can convert the aldehyde bound to soybean protein into the corresponding acid (n-caproic acid).

When a mixture of soybean extract and n-hexanal was previously treated with aldehyde dehydrogenase in the presence of NAD+, no n-hexanal was detected in any fractions, but n-caproic acid was found in fractions 15–20.

When soybean extract was incubated with n-hexanol, no hexanol was detected in the protein fractions; and n-hexanol was recovered entirely in low-molecular weight fractions.

In the case of a mixture of soybean protein and n-caproic acid, no n-caproic acid was detected in protein fractions but all n-caproic acid was recovered in low-molecular weight fractions.

These results illustrate that n-hexanal strongly interacts with soybean protein but the corresponding alcohol (n-hexanol) and acid (n-caproic acid) do not.

DESCRIPTION OF THE INVENTION

Disagreeable odors affecting the flavor of protein or protein-containing materials containing aldehydes and/or alcohols can be removed, in accordance with the present invention, by dissolving or suspending various proteins or protein-containing materials containing aldehydes and/or alcohols in water or an aqueous solution containing salts, subsequently adding one of aldehyde oxidase with an electron acceptor if necessary or aldehyde dehydrogenase with a hydrogen acceptor if necessary; or alcohol dehydrogenase with a hydrogen acceptor if necessary and at least one of aldehyde dehydrogenase and aldehyde oxidase with an electron acceptor; and, if necessary, separating the protein or protein-containing materials after the enzymatic reactions are completed. The proteins liberated from the disagreeable odors affecting flavor may be used for edible purpose for everyone, and thus the present invention has a great effect in this respect.

The present invention is applicable to proteins containing aldehydes and/or alcohols, for example, albumin, casein, vegetable protein, such as soybean protein, peanut protein, etc.; or protein-containing materials containing aldehydes and/or alcohols, for example, vegetable protein-containing materials, such as raw soybeans, defatted soybeans, etc.; animal protein-containing materials, such as mutton, etc., and all foods and beverages containing these substances.

Above all, the present invention provides a process suitable for improving flavor of vegetable protein containing n-hexanal, n-hexanol, and the like.

In the present invention, aldehyde dehydrogenase prepared from bovine liver, horse liver, yeast, etc. is appropriate. The aldehyde dehydrogenase used in the present invention has very broad substrate specificity, and efficiently acts upon various aldehydes such as n-hexanal, acetaldehyde, glutaraldehyde, malonaldehyde, n-propanal, n-heptanal, n-decanal, etc.

Appropriate aldehyde oxidases are prepared from bovine liver, rabbit liver, horse liver, pig liver, and the like.

Aldehyde oxidase requires an electron acceptor, and the preferable electron acceptors include oxygen, potassium ferricyanide, methylene blue, 2,6-dichlorophenolindophenol, and the like. As an electron acceptor, oxygen dissolved in the reaction system can be usually used. If necessary, oxygen may be supplemented from the outside. When there is a large amount of flavor components, hydrogen peroxide formed in the enzymatic reaction may be broken down by adding catalase.

According to the invention, alcohol dehydrogenase prepared from bovine liver, horse liver, yeast, soybean protein, etc. may be used.

The enzymatic reaction can be carried out by adding an aldehyde dehydrogenase to a solution or suspension of protein or protein-containing material (the order can be reversed).

An appropriate temperature for the enzymatic reaction is 20°-40° C., and an appropriate pH range is 6.0-10.0, preferably 8.5-9.5.

The amount of the enzyme used is usually about 0.001-1 unit per one gram of protein. However, this depends upon the amount of flavor components in the sample to be removed, and would be adjusted accordingly.

In the present invention, alcohol dehydrogenase is used usually together with either aldehyde dehydrogenase or aldehyde oxidase. In the enzymatic reaction using alcohol dehydrogenase, the amount of alcohol dehydrogenase, reaction temperature, pH, etc. are substantially the same conditions as when aldehyde dehydrogenase or aldehyde oxidase is used alone.

When a hydrogen acceptor is contained in the enzyme or in the protein, it is not necessary to specifically add a hydrogen acceptor to reaction mixture. $NAD^+$ or a material containing $NAD^+$ (for example, a yeast extract solution) is usually used as hydrogen acceptor. It is usually preferable to carry out the enzymatic reaction by adding 0.1-10 mM $NAD^+$ (final concentration).

Examples of the salts used in the present invention include various salts of phosphoric acid, etc.

Enzyme Activities

Determination of enzyme activity may be carried out as follows wherein concentrations of reagents are final.
(1) Aldehyde dehydrogenase from bovine liver.

The reaction mixture contained, in a total volume of 3.0 ml, 100 mM sodium pyrophosphate buffer (pH 9.3), 0.3 mM $NAD^+$, 3 mM acetaldehyde and the enzyme. The enzyme activity was measured at 25° C. by following the production of $\beta$-NADH (the increase in absorbance at 340 nm) with a Shimazu double-beam spectrophotometer, model UV-200, equipped with a recorder.
(2) Aldehyde dehydrogenase from yeast.

The reaction mixture contained, in a total volume of 3.0 ml, 50 mM Tris-HCl buffer (pH 8.5), 1.3 mM dithiothreitol, 0.3 mM $NAD^+$, 200 mM KCl, 3 mM acetaldehyde and the enzyme. The enzyme activity was measured as described in (1) above.
(3) Alcohol dehydrogenase from horse liver and soybean extract.

The reaction mixture contained, in a total volume of 3.0 ml, 100 mM sodium pyrophosphate buffer (pH 9.3), 0.3 mM $NAD^+$, 50 mM semicarbazide (pH 9.3), 10 mM ethanol and the enzyme. The enzyme activity was measured as described in (1) above.
(4) Aldehyde oxidase from bovine liver.

The reaction mixture contained, in a total volume of 3.0 ml, 100 mM sodium pyrophosphate buffer (pH 9.3), 1.3 mM EDTA, 100 mM $(NH_4)_2SO_4$ (pH 9.3), 33.3 mM acetaldehyde, 0.5 mM potassium ferricyanide and the enzyme. The enzyme activity was measured at 25° C. by following the decrease in absorption at 420 nm (decrease in the amount of $Fe^{3+}$) with a Shimazu double-beam spectrophotometer, model UV-200, equipped with a recorder.

In all instances, one unit of enzyme activity is defined as the amount of enzyme which catalyzes the conversion of 1 $\mu$mole of the substrate to the product per minute under the conditions described. The specific activity is defined as units per mg of protein.

Enzymes (1) Purification of aldehyde dehydrogenase from bovine liver mitochondria.

500 g of bovine liver was added to 2 L. of a buffer A [5 mM tris buffer (pH 7.5) containing 0.25 M sucrose and 0.1 mM EDTA] and homogenized in a Waring blender. The resulting mixture was then centrifuged (500×g for 10 minutes), and the thus obtained supernatant was further centrifuged (10,000×g for 10 minutes). The resulting precipitate (mitochondria) was suspended in a buffer B [20 mM phosphate buffer solution (pH 7.5) containing 0.1 mM EDTA], and the suspension was centrifuged (10,000×g for 10 minutes). The resulting precipitate was suspended in buffer B, and the suspension was sonicated. After centrifugation (20,000×g for 30 minutes), the supernatant was subjected to acetone fractionation at −10° C. After an equal volume of chilled acetone (−10° C.) was slowly added to the supernatant, the precipitate was collected by centrifugation. The enzyme was extracted with buffer B from the precipitates. To this extract, ammonium sulfate was added to bring the salt concentration to 75% saturation. The resulting precipitate was collected by centrifugation and dissolved in buffer B. To this solution, ammonium sulfate was added to 30% saturation; and after centrifugation, the precipitate was discarded. The supernatant was brought to 45% saturation by the addition of ammonium sulfate. The precipitate obtained by centrifugation was dissolved in buffer B. The solution was passed through a column containing Sephadex G-50 equilibrated with 5 mM phosphate buffer containing 0.1 mM EDTA. Protein fractions were added to a column (4.7×29 cm), containing DEAE-Sephadex A-50 previously equilibrated with the above phosphate buffer. The column was developed with a linear gradient of KCl ranging from 0 to 0.5 M. The aldehyde dehydrogenase activity was eluted with about 0.2 M KCl. The active fractions were pooled.

The specific activity of the enzyme preparation pooled is $264.0 \times 10^{-3}$ units/mg, which is about 29.3 times larger than that of the crude extract.

(2) Purification of aldehyde oxidase from bovine liver.

80 g of bovine liver was added to 320 ml of an isotonic solution [an aqueous 1.15% KCl solution (pH 7.8) containing 0.1 mM EDTA] and homogenized in a Waring blender. The resulting mixture was centrifuged (105,000×g for 60 minutes). To the supernatant, saturated ammonium sulfate solution (pH 9.3) was added to bring the salt concentration to 75% saturation. The precipitate was collected by centrifugation, and dissolved in a 1.15% KCl solution (pH 7.8). The solution was subjected to ammonium sulfate fractionation. The enzyme activity was found in 40–50% ammonium sulfate fraction. Specific activity of the purified aldehyde oxidase is $27.6 \times 10^{-3}$ units/mg.

(3) Yeast aldehyde dehydrogenase.

Yeast aldehyde dehydrogenase was purchased from Boehlinger Mannheim GmbH (Mannheim, Germany).

(4) Alcohol dehydrogenase.

Crude extract obtained from defatted soybean flour was used as soybean alcohol-dehydrogenase preparation. Horse liver alcohol dehydrogenase was purchased from Boehlinger Mannheim GmbH (Mannheim, Germany). The enzyme solution was passed through Sephadex G-50 column to remove ethanol before use.

Certain specific embodiments of the present invention are illustrated by the following representative examples.

EXAMPLE 1

In this example, 15 g of defatted soybean was suspended in 100 ml of water. The suspension was stirred at room temperature for one hour, and centrifuged at 27,000×g for 20 minutes to obtain the supernatant (soybean extract). The reaction mixture contained 2.3 ml of soybean extract, 66 mM pyrophosphate buffer (pH 9.5) and the components shown in Table 1 to a total volume of 6.0 ml. The reaction was carried out at 25° C. for three hours.

TABLE 1

| | Components added | | |
|---|---|---|---|
| | Bovine liver mitochondria aldehyde dehydrogenase (0.032 unit)[a] | NAD+ (60 micromoles)[a] | Pyrazole[b] (6 micromoles)[a] |
| 1 | − | − | − |
| 2 | + | − | − |
| 3 | − | + | − |
| 4 | − | − | + |
| 5 | + | + | + |
| 6 | + | + | − |

[a]Amount of the component added.
[b]Inhibitor of alcohol dehydrogenase.

After the completion of the reaction, the samples were evaluated for green bean flavor by a 10-member trained panel. The samples had increased green bean flavor in the following order.

1=2=3=4>>5>6

The green bean flavor was greatly reduced by addition of NAD+ and aldehyde dehydrogenase. No substantial green bean flavor was detected in Sample 6. Pyrazole is an inhibitor of alcohol dehydrogenase, and strong alcohol dehydrogenase activity was observed in the soybean extract solution. Thus, the stronger green bean flavor of Sample 5 in comparison to Sample 6 is due to the alcohol, because alcohol dehydrogenase in Sample 5 is inhibited by pyrazole. n-Hexanal, n-hexanol and n-caproic acid were detectable in Samples 1, 2, 3 and 4 with gas chromatography. In Sample 5, n-hexanal disappeared but n-hexanol and n-caproic acid were detected. In Sample 6, n-hexanal and n-hexanol disappeared. In Samples 5 and 6, an increase in the amount of n-caproic acid was observed as compared with Sample 1. Similar results were obtained when yeast aldehyde dehyrogenase was used.

EXAMPLE 2

In this example, to 15 g of defatted soybean flour, 150 ml of water was added, and the mixture was stirred at room temperature for 30 minutes to extract protein. The extract was centrifuged at room temperature at 10,000×g for 10 minutes. After the precipitate was extracted again with the same procedure as the first extraction, both supernatants were combined.

The soybean extract (about 270 ml) was adjusted to pH 9.3 with 10 N NaOH, and then mixed with aldehyde dehydrogenase from bovine liver (3 units), NAD+ (final concentration 3 mM) and EDTA (final concentration 0.1 mM). The mixture was incubated with stirring at 30° C. for 3 hours. Green bean flavor was substantially eliminated by this treatment.

The solution was then adjusted to pH 4.5, and centrifuged at 10,000×g for 10 minutes to collect the precipitate, which was then suspended in 150 ml of water and centrifuged. After the precipitate was suspended in 150 ml of water, the suspension was adjusted to pH 7.5 with 10 N NaOH. Then, the solution was stirred at room temperature for one hour, and readjusted to pH 7.5, whereby a clear solution was obtained. Isolated soybean protein as a white powder was obtained by lyophilizing the protein solution.

The isolated protein had no substantial green bean flavor as compared with a control which was obtained by the same treatment as above except that aldehyde dehydrogenase was not added.

The isolated protein in powder form was stored at both 4° C. and 37° C. for about one month, and taken out at intervals for an organoleptic test. Appearance of disagreeable smell in the sample treated with the enzyme was not observed under these conditions of storage. On the other hand, an increase in green bean flavor was observed after one week in the case of the control. The green bean flavor increased with the time of storage. Further, no substantial green bean flavor was detected when the enzyme-treated isolated protein after storage for one month (at 4° C. and 37° C.) was dissolved in water for an organoleptic test. On the other hand, in the case of the control, green bean flavor was distinctly observed in an aqueous solution just after the preparation, and it was observed that the green bean flavor was considerably increased when the protein was dissolved in water for an organoleptic test after one-month storage in powder form (at 4° C. and 37° C.).

The aqueous solution of isolated protein which was not treated with the enzyme had a strong green bean flavor even after the protein was first dissolved in water, and the green bean flavor was greatly intensified after standing for one day at room temperature. On the other hand, the isolated protein which was treated with the enzyme had no green bean flavor when dissolved in water and no disagreeable smell was observed even after standing for one day at room temperature.

It is apparent from these results that aldehyde dehydrogenase oxidizes the aldehydes bound to the soybean protein.

EXAMPLE 3

In this example, 15 g of soybean was suspended in 500 ml of water overnight, then mixed with 0.2 M pyrophosphate buffer solution (pH 9.3), and milled. The resulting mixture was filtered through two sheets of gauze, and the filtrate was boiled at 100° C. for 30 minutes to prepare soybean milk. After cooling, the soybean milk was mixed with aldehyde dehydrogenase from bovine liver (3 units) and $NAD^+$ (final concentration 3 mM), and stirred at 30° C. for 3 hours. Green bean flavor of the soybean milk was considerably reduced by this aldehyde dehydrogenase treatment, as compared with that of a control soybean milk which was not treated with the enzyme. The green bean flavor was further reduced by adding alcohol dehydrogenase from horse liver together with the aldehyde dehydrogenase.

Then, 6 N HCl was added to the soybean milk previously treated with the enzyme to adjust the pH to 4.5, and the milk was centrifuged at 10,000×g for 10 minutes. The resulting precipitate was suspended in 150 ml of water and the suspension was centrifuged. The resulting precipitate was suspended in 150 ml of water, and then the suspension was adjusted to a pH of 7.5 with 10 N NaOH and stirred for one hour to dissolve the protein. After a readjustment of pH, the solution was lyophilized. Green bean flavor of the soybean protein obtained as white powder was reduced as compared with that of the control which was not subjected to the enzyme treatment.

EXAMPLE 4

In this example, after 40 ml of water was added to 10 g of minced mutton, the mutton was boiled for 15 minutes. After cooling, the suspension was prepared in a mixer and filtered through two sheets of gauze. The resulting filtrate was treated with aldehyde dehydrogenase to improve its flavor. To 2.50 ml of the filtrate were added 2.50 ml of 0.2 M pyrophosphate buffer solution (pH 9.3), 0.3 ml of 0.1 M $NAD^+$ and 0.7 ml of aldehyde dehydrogenase solution from bovine liver (0.7 unit/ml). The mixture was shaked at 25° C. for one hour, and subjected to an organoleptic test. The mutton smell is considerably reduced by the enzyme treatment, whereas the mutton smell was not changed in the control which was not subjected to the aldehyde dehydrogenase treatment.

EXAMPLE 5

In this example, 1.5 g of defatted soybean and raw soybean powder were suspended individually in 30 ml of 0.2 M pyrophosphate buffer (pH 9.3). The suspensions were stirred at room temperature for one hour, and centrifuged at 10,000×g for 10 minutes to obtain supernatants (defatted soybean extract and raw soybean extract).

Removal of green bean flavor by aldehyde oxidase was investigated for the above two extracts and a n-hexanal solution (Table 2). Reaction mixtures contained, in a total volume of 6.5 ml, 0.1 mM EDTA, 100 mM $(NH_4)_2SO_4$ (pH 9.3), 2.5 mM electron acceptor and 0.06 unit aldehyde oxidase. The enzymatic reaction was carried out under aerobic conditions. When no electron acceptor was added, the reaction was carried out under aerobic conditions where the dissolved oxygen served as an electron acceptor. As a control, menadione, a specific inhibitor of aldehyde oxidase, was added. The reaction mixtures were allowed to stand at 30° C. for one hour, and then subjected to an organoleptic test.

TABLE 2

| Compound added | Concn. | Defatted soybean extract | Raw soybean extract | n-hexanal[a] |
| --- | --- | --- | --- | --- |
| Menadione | 8 μM | +++ | +++ | +++ |
| Dissolved oxygen | | ± | ± | — |
| Potassium ferricyanide | 2.5 mM | ± | ± | — |
| Methylene blue | 2.5 mM | ± | — | — |
| 2,6-dichloro-phenol-indophenol | 2.5 mM | ± | ± | — |

[a]0.14 mM in the final concentration.

In Table 2 above, (+++) indicates that green bean flavor is very strong, (±) indicates that some members recognize slight green bean flavor, and (—) indicates that no member recognizes green bean flavor.

As is evident from the foregoing table, dissolved oxygen, ferricyanide, methylene blue, and 2,6-dichloro-phenol-indophenol are effective electron acceptors, and remarkable deodorizing effect was observed. When menadione was added, aldehyde oxidase was completely inhibited and no effect on the beany flavor of the samples was observed.

EXAMPLE 6

In this example, 300 ml of 0.1 M pyrophosphate buffer solution (pH 9.3) was added to 15 g of defatted soybean, and the resulting mixture was stirred at room temperature for one hour to extract protein. After centrifugation at 10,000×g for 10 minutes, the resulting supernatant (defatted soybean extract solution) was mixed with 3 units of aldehyde oxidase prepared from bovine liver, EDTA (final concentration 0.1 mM). and $(NH_4)_2SO_4$ (pH 9.3) (final concentration 100 mM). The mixture was stirred at 30° C. for 3 hours. Green bean flavor of the defatted soybean extract solution was greatly reduced. The reaction mixture was acidified with 6 N HCl to adjust the pH to 4.5 and to precipitate protein. The resulting suspension was centrifuged at 10,000×g for 10 minutes to collect precipitate. The precipitate was suspended in 150 ml of water, and the suspension was again centrifuged to collect precipitate. The precipitate was suspended in 150 ml of water and mixed with 10 N NaOH to adjust the pH to 7.5. The suspension was stirred for one hour to dissolve the precipitate. The resulting solution was readjusted to pH 7.5, and then lyophilized. 4 g of white isolated protein was obtained.

The isolated protein obtained was dissolved in water, and had no substantial disagreeable green bean flavor. Isolated protein obtained without the enzymatic treatment had strong green bean flavor. When NAD+ was added to the complete reaction mixture above mentioned, green bean flavor of the mixture after completion of the reaction was less than that of complete reaction mixture. It seems that alcohols that constitute a portion of green bean flavor were converted to aldehydes by the action of soybean alcohol dehydrogenase in the extract solution, and these aldehydes were further converted to acids by the action of aldehyde oxidase. When the isolated protein prepared from the complete reaction mixture was compared with that from the reaction mixture containing NAD+, no green bean flavor was detected in both samples. It seems that alcohols were not strongly bound to protein and were removed during the preparation of isolated protein. Therefore, no green bean flavor was observed even in the isolated protein prepared by adding only the aldehyde oxidase.

After these enzyme-treated and non-treated proteins were stored at 4° C. and 37° C. for two weeks, green bean flavor were compared. The non-treated protein had a considerably increased green bean flavor. On the other hand, slight green bean flavor was detected in the enzyme-treated one.

EXAMPLE 7

In this example, 15 g of raw soybean was suspended in 500 ml of water overnight, mixed with 0.2 M pyrophosphate buffer solution (pH 9.3) and homogenized. The resulting mixture was filtered through two sheets of gauze, and the filtrate was boiled at 100° C. for 30 minutes to prepare soybean milk. After cooling, the soybean milk was mixed with aldehyde oxidase prepared from bovine liver (3 units), EDTA (final concentration 0.1 mM), and $(NH_4)_2SO_4$ (pH 9.3) (final concentration 100 mM) and incubated with stirring at 30° C. for 3 hours. Disagreeable green bean flavor detected in the initial soybean milk was remarkably reduced by the aldehyde oxidase treatment.

When alcohol dehydrogenase of horse liver and NAD+ were added to the soybean milk in addition to the aldehyde oxidase, great reduction of green bean flavor was observed. It is believed that this is due to the fact that the alcohols contributing to the flavor are converted to the aldehydes by alcohol dehydrogenase which aldehydes are completely converted to acids by the aldehyde oxidase.

To the soybean milk treated with the enzyme, 6 N HCl was added to adjust the pH to 4.5, and the resulting protein precipitate was collected by centrifugation. The precipitate was suspended in 150 ml of water, and again collected by centrifugation. The resulting precipitate was suspended in 150 ml of water, and the suspension was adjusted to pH 7.5 with 10 N NaOH. The suspension was stirred for one hour, again adjusted to pH 7.5, and lyophilized whereby about 5 g of soybean protein in white powder was obtained. The thus obtained soybean protein had a very weak green bean flavor as compared with the control (soybean protein obtained by the same treatment as above except that aldehyde oxidase was not added).

What is claimed is:

1. Process for improving the flavor of protein containing aldehydes which comprises reacting said protein with aldehyde dehydrogenase in the presence of a hydrogen acceptor or aldehyde oxidase in the presence of an electron acceptor until the free and bound aldehydes in said protein are converted to the corresponding acids.

2. Process according to claim 1 wherein said protein contains alcohols and said protein is also reacted with alcohol dehydrogenase in the presence of a hydrogen acceptor until said alcohols in said protein are converted to the corresponding aldehydes.

3. Process according to claim 1 wherein said hydrogen acceptor is selected from the group consisting of NAD+, and substances containing NAD+, and said electron acceptor is selected from the group consisting of oxygen, potassium ferricyanide, methylene blue and 2,6-dichlorophenol-indophenol.

4. Process according to claim 2 wherein said hydrogen acceptor is NAD+ or a substance containing NAD+.

5. Process according to claim 1 wherein said reaction is carried out at a temperature of 20°–40° C. and a pH of 8.5–9.5.

6. Process according to claim 1 wherein from 0.001 to 1 unit of enzyme is used per gram of protein.

7. Process according to claim 3 wherein the final concentration of NAD+ in the reaction medium is 0.1–10 mM.

8. Process for improving the flavor of protein containing aldehydes and alcohols which comprises reacting said protein in an aqueous solution with an enzyme system comprising aldehyde dehydrogenase and a hydrogen acceptor of aldehyde oxidase and an electron acceptor and an enzyme system comprising alcohol dehydrogenase and a hydrogen acceptor at 20°–40° C. and a pH of 8.5–9.5 until the aldehydes and alcohols in said protein are converted to acids and thereafter separating said protein from said reaction medium.

* * * * *